Feb. 28, 1928.

C. E. LOWE 1,660,343

APPARATUS FOR MAKING INNER TUBES

Filed March 7, 1927

Clyde E. Lowe
Inventor
by Smith and Freeman
Attorneys

Patented Feb. 28, 1928.

1,660,343

UNITED STATES PATENT OFFICE.

CLYDE E. LOWE, OF EAST CLEVELAND, OHIO.

APPARATUS FOR MAKING INNER TUBES.

Application filed March 7, 1927. Serial No. 173,359.

This invention relates to the manufacture of inner tubes for pneumatic vehicle tires and has for its object the provision of simple, inexpensive and reliable mechanism which shall perform the combined function of preventing admission of pressure fluid beneath the tube, of trimming the tube to the proper length, and of beveling or skiving the ends of the tube preparatory to splicing. In the manufacture of these inner tubes it is customary to build or locate the raw rubber tube on a form called a mandrel and subject the same to pressure during the heat-treating operation whereby the rubber is cured. In order to secure a proper compactness of the tube-wall it is necessary to exclude the pressure fluid from penetrating between the tube and mandrel during the curing operation; and after curing has been completed the tube is withdrawn from the mandrel and the two ends spliced together which requires that the ends of the tube be skived or beveled which has heretofore required, at least in many cases, a special independent operation. By the use of the apparatus described in this application all these things can be done reliably and by single operation, and the apparatus reused indefinitely.

Figure 1:
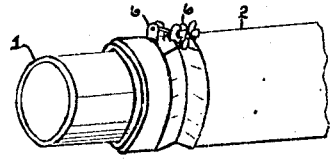
Figure 2:
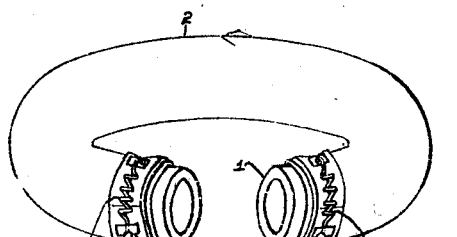
Figure 3:
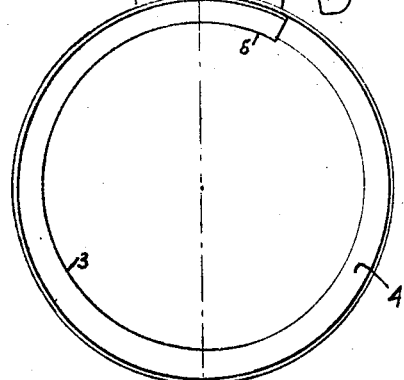
Figure 4:
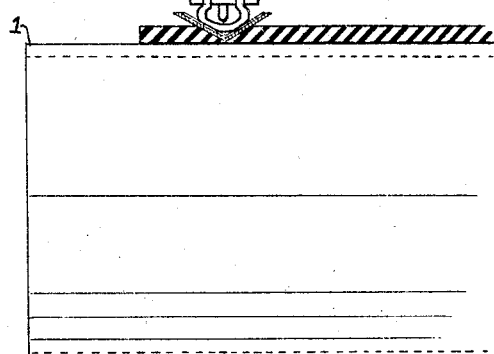
Figure 5:
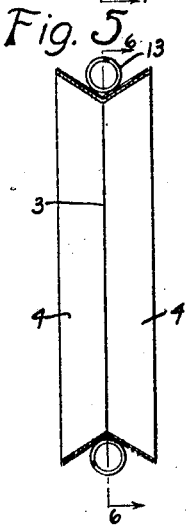
Figure 6:
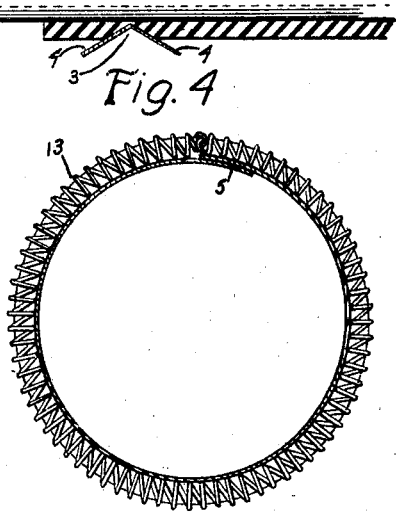
Figure 7:
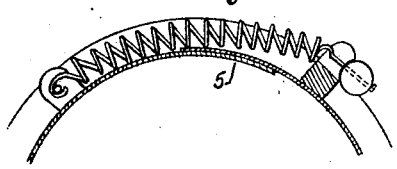

In the drawings accompanying and forming a part of this application Fig. 1 is a perspective view of one end of a mandrel and uncured tube illustrating the use of my invention; Fig. 2 is a perspective view showing the use of my improvements in combination with a curved type of mandrel; Fig. 3 is a side view of one of my improved throttling and skiving rings; Fig. 4 is a longitudinal sectional view through a tube curing apparatus including one of my rings; Figs. 5 and 6 are sectional views through a modified form of ring; and Fig. 7 is a detail view showing the type of ring illustrated in Fig. 2.

In the manufacture of an inner tube a mandrel 1 of suitable length, diameter, and cross-section has applied thereto or built thereon a tube 2 of raw rubber compound. I have illustrated hollow metal mandrels of circular cross section, straight in Fig. 1 and arcuate in Fig. 2, though it will be understood that other materials and shapes can be employed.

To each end of the tube I apply a ring having a peripheral shape to fit closely the exterior of the mandrel and of a transverse shape to afford the desired taper at each end of the tube. To this end the ring is preferably made of a band of flexible metal, such as sheet steel, fashioned to the shape of a wide-spreading V as illustrated in Figs. 4 and 5, the apex 3 of the V facing inwardly and the sides 4—4 diverging therefrom, and hence from the walls of the mandrel to which the device is applied. The ends of the ring overlap at one end as illustrated at 5, and suitable means are provided to construct this ring upon the tube to which it is applied. In the form shown in Figs. 1 and 3 these means comprise a pair of rigid ears 6—6 carried by the respective ends of the ring, having a clamping bolt 7 pivoted in one ear and detachably engaging the other ear through the agency of a thumb nut 8 and rocker 9. The meeting ends of the ring are so fashioned and beveled as to slide smoothly over each other with a minimum of gouging effect. In the form of the invention shown in Figs. 2 and 7, the ears are set further apart and a tension spring 10 connected therebetween so as to exert a continuous constricting effect upon the ring during the curing operation. Preferably this spring is pivoted at one end and detachably secured at the other as by the ball 11, fitting a socket 12 provided in one of the ears, thus enabling all tension to be removed during the application and removal of the clamp. According to another form of the invention shown in Figs. 5 and 6 the ears are omitted and a garter spring 13 caused to encircle the ring in the angle defined by the two sides of the V. In all cases it is necessary to choose the angles so that the apex 3 may form an edge sufficiently sharp to cut through the rubber gum.

After the tube has been applied to the mandrel a ring is applied adjacent to each end of the tube and gripped thereon in such wise as to prevent the penetration of pressure fluid between the tube and mandrel during the curing operation. With the form of the invention shown in Figs. 1 to 4, inclusive, the nut 8 is screwed down sufficiently at the outset to bring the cutting edge of the V substantially into engagement with the mandrel thereby substantially severing the extremity of the tube from the body thereof; in the form of the invention shown in Figs. 2, 5, 6, and 7, the initial pressure is not sufficient to effect this, but the ring gradually contracts upon the tube as the latter softens under the heat of the curing and effects the severing prior to the end of the operation. The slanting walls of the ring impose sufficient pressure on the rubber to prevent accidental displacement of the same or entrance of pressure fluid and also afford the desired skive for splicing. It is seldom that the end portion is wholly severed from the body of the tube by this apparatus but the same can ordinarily be pulled away by the fingers leaving a sufficiently clean cut for the next operation.

It is not important that the trimming or waste end be skived, but it is desirable that each ring be symmetrical, both to facilitate its application, to reduce errors, and to overcome any tendency to slip or drift to one side. However, it is not strictly necessary that the two sides be symmetrical or that the cutting edge be in the center, and other changes can be made within the scope of my inventive idea.

Having thus described my invention what I claim is:

1. In tube curing apparatus, the combination with a mandrel adapted to receive a raw tube, of a constrictible metal clamp adapted to embrace said mandrel and having a peripheral contour similar to that of the mandrel and having the cross section of a wide spreading V defining a cutting edge and two tapering surfaces.

2. A combined clamping, cutting, and skiving device for tire tube manufacture, consisting of a metal strip having the cross section of a wide spreading V formed with its ends overlapping and the apex of the V turned inwardly, to define a cutting edge, and means for constricting said device upon a mandrel to sever a tube thereon and skive the tube end.

3. A combined clamping, cutting and skiving device for tire tube manufacture, consisting of a metal strip having the cross section of a wide spreading V formed with its ends overlapping and the apex of the V turned inwardly, to define a cutting edge, and spring means for constantly exerting a constricting action upon said device during the curing operation whereby the tube is severed and skived.

In testimony whereof I hereunto affix my signature.

CLYDE E. LOWE.